United States Patent [19]

Johnson

[11] 4,122,936
[45] Oct. 31, 1978

[54] CENTERING MECHANISM FOR MOVABLE MEMBER WITHIN A VARIABLE-WIDTH PASSAGEWAY

[75] Inventor: James F. Johnson, LaGrange Park, Ill.

[73] Assignee: Packard Instrument Company, Inc., Downers Grove, Ill.

[21] Appl. No.: 779,367

[22] Filed: Mar. 21, 1977

[51] Int. Cl.$^2$ ............................................. B23Q 7/00
[52] U.S. Cl. .................................... 198/339; 214/310; 187/95; 308/4 R; 250/328
[58] Field of Search .............. 198/339, 341, 345, 472, 198/485, 580, 795, 860, 861; 250/328; 73/421 R, 423 A; 214/300, 301, 309, 310, 16.1 CC, 16.1 CD; 23/230 R, 230.3, 253 R, 259; 187/17, 95; 308/4 A, 4 R

[56] References Cited

U.S. PATENT DOCUMENTS

| | | | |
|---|---|---|---|
| 1,911,997 | 5/1933 | Gillespie | 308/4 A |
| 3,598,996 | 8/1971 | Haebler et al. | 250/328 |
| 3,692,109 | 9/1972 | Grayson | 308/4 A |
| 3,890,505 | 6/1975 | Olson | 250/328 |
| 4,035,642 | 7/1977 | Johnson et al. | 250/328 |

Primary Examiner—Joseph E. Valenza
Attorney, Agent, or Firm—Leydig, Voit, Osann, Mayer & Holt, Ltd.

[57] ABSTRACT

A mechanism for centering a movable member within an elongated passageway of variable width, such as for use in an article transport system of a benchtop scintillation detector or other laboratory sample processor. The centering is performed by a plurality of outwardly bowed guide elements attached to the movable member, arranged around the periphery of the movable member, and oriented generally along the axis of travel of the movable member. In the particular embodiment herein, the guide elements are maintained in bowed position by one or more biasing means housed within the movable member. The bowing of the guide elements urges the movable member toward the center of the passageway at all times, regardless of the transverse dimension of the passageway, and regardless of the presence of gaps in the passageway.

6 Claims, 8 Drawing Figures

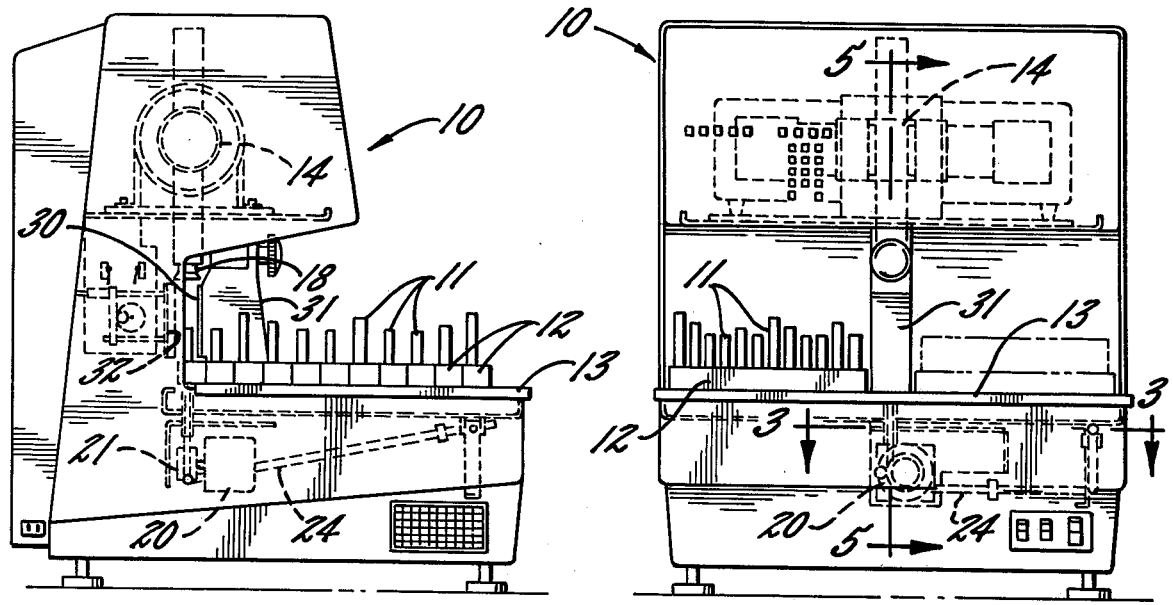
Fig. 1.
Fig. 2.
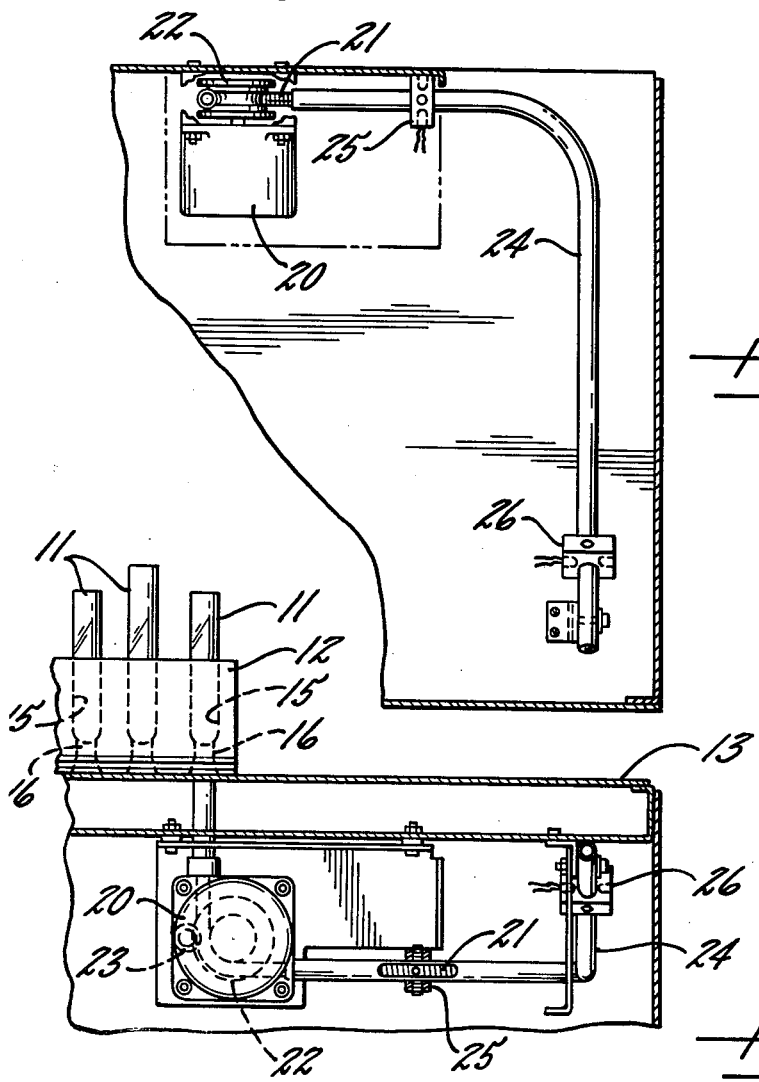
Fig. 3.
Fig. 4.

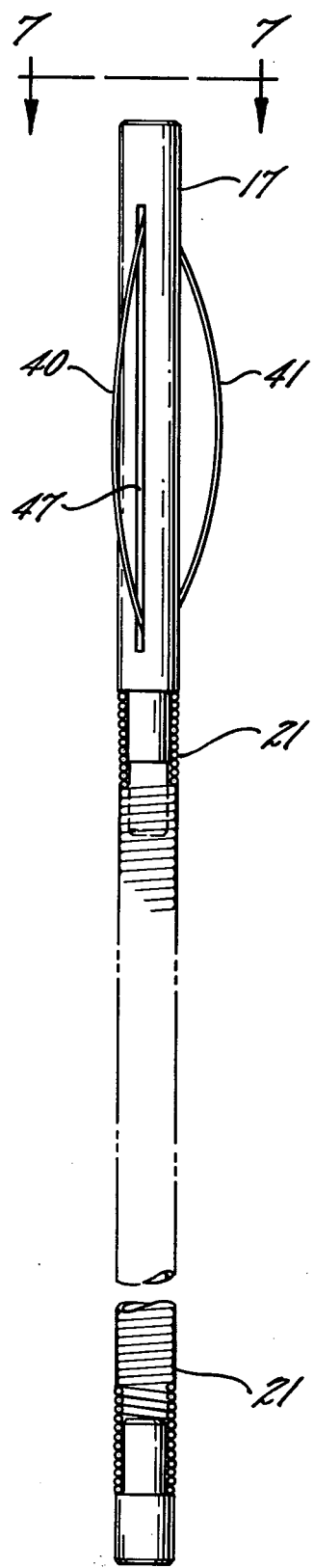
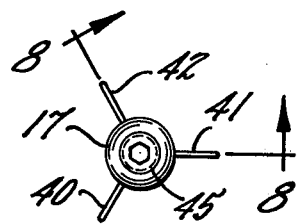
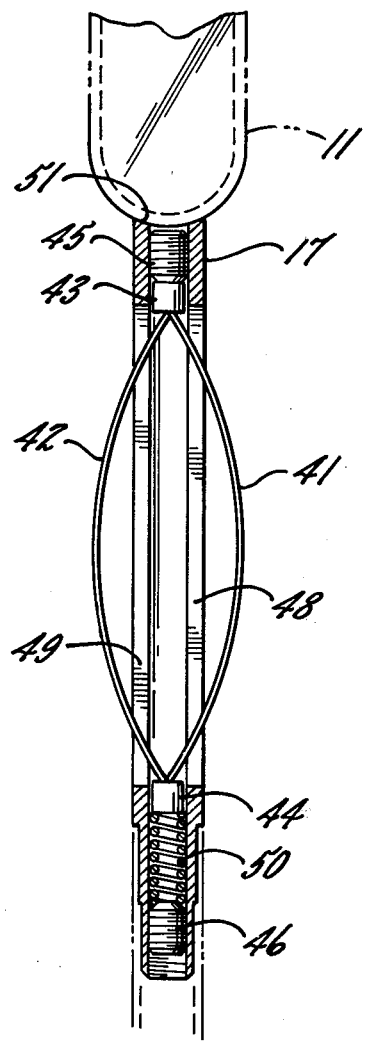
fig. 6.
fig. 7.
fig. 8.

CENTERING MECHANISM FOR MOVABLE MEMBER WITHIN A VARIABLE-WIDTH PASSAGEWAY

DESCRIPTION OF THE INVENTION

The present invention relates generally to movable members within passageways and, more particularly, to a mechanism for centering a movable member within an elongated passageway having a variable width.

This invention is especially well adapted for use in a non-uniform passageway, for example where at least a portion of the passageway is of significantly greater transverse dimension than the movable member. The passageway may also be segmented, and such segments may be separated by gaps. In addition, some portions of the passageway may have a transverse dimension that varies continuously along the length thereof or abruptly in some places. The mechanism is designed to maintain the movable member in approximately centered position within the passageway at all times as the movable member travels past these irregularities and gaps, and enters and leaves passageway segments of differing transverse dimensions.

This invention is particularly well-suited for use in a passageway or passageways of an article transport system, such as is found in a benchtop scintillation counter or other laboratory instrument adapted for handling or processing vials, test tubes, or other vessels containing biological or chemical samples for processing or radiation counting. For example, the passageway of a typical benchtop scintillation counter consists of a vertical well extending from a shielded counting chamber to a point below a stage, on top of which stage rest a plurality of trays or cassettes containing sample vials. This well usually contains segments of varying widths, gaps, and other irregularities. Some of these detectors use automatic indexing and advancing systems to move the trays or cassettes into position one at a time for counting or processing.

The particular embodiment of the invention to be described and illustrated herein is utilized in a benchtop scintillation counter adapted for handling rows of cassettes, each cassette holding a row of sample tubes which might be of differing sizes. The cassettes are automatically moved into a position below the counting chamber so that each sample tube in turn is placed in line with the vertical well. An elevator pedestal attached to an elongated motor-driven member then rises through a hole in the cassette beneath the tube that is aligned with the well, lifts the tube up into the counting chamber, and subsequently lowers the tube back into the cassette when counting is complete. It is essential that the pedestal be properly centered at all times, to allow proper transport of the tubes without jamming. Some type of transport system is necessary because the counting chamber must be displaced from the sample storage and indexing stage due to its bulky lead shielding and the need to seal the counting chamber from ambient light. Also, each tube, of course, must be removed from the presence of other tubes containing radioactive samples for accurate counting. Since each tube rests in a vertically oriented compartment in a cassette, a vertical well extending up into the chamber, within which the tubes are transported, provides a simple solution. The well segment attached to the chamber should be shielded and should be fairly long and narrow so as to minimize the exposed area through which external radiation from other tubes and the environment can enter the counting chamber. This is particularly important in the case of samples labeled with gamma-emitting isotopes. Thus, the pedestal should be small enough to allow use of such a narrow passageway.

The holes in the cassettes beneath each tube must be small enough to prevent the smallest tube being used from slipping through, yet large enough to allow passage of the elevator pedestal and its attached elongated driving member. The width of the passageway extending above the cassette and into the counting chamber must also be large enough to allow passage of the widest tube being used. Thus, this portion of the passageway is significantly wider than any elevator pedestal small enough to pass through the holes below each tube. There is also an open space between the top of the cassette and the upper portion of the passageway to accommodate tubes of different lengths as they are indexed into position below this passageway. This space may be partially filled by a movable guide which is advanced into position around the tube before it is raised, but small gaps, of necessity, remain to provide clearance for the movable guide and to allow for slight differences in the height of the cassettes. Thus, it is seen that numerous difficulties must be overcome in designing a centering mechanism for an elevator pedestal meeting all of the above criteria.

Consequently, it is a primary object of the present invention to provide a mechanism for keeping an elevator pedestal properly centered as it is raised and lowered through successive holes in the bottom of a cassette.

Another object of the invention is to provide a mechanism for keeping such a pedestal centered within an elongated passageway at all times as the pedestal traverses the full length of the passageway, to prevent jamming. In this connection, a more particular object is to prevent the pedestal from jamming in portions of the passageway that are of significantly greater width than the pedestal, at the boundaries between portions of the passageway of different widths, in portions of the passageway having continually or abruptly changing widths, or in gaps between portions of the passageway.

A further object of the invention is to provide a centering mechanism capable of being used without modification in different sized passageways of different laboratory instruments or other devices involving the transport of articles within elongated passageways.

Still another object of the invention is to provide an improved centering mechanism that is particularly useful in transporting radioactive samples in scintillation counters in that it minimizes interference between the radioactive material in the sample container and the crystal detector, especially in measurements of the lower energies. In this connection, a related object of the invention is to provide such a centering mechanism that improves the counting statistics in a scintillation counter by maintaining the center of activity of the sample close to the center of the detector regardless of the size of the sample container.

A still further object of the invention is to provide a centering mechanism capable of being adapted for use with small size pedestals and within narrow passageways.

Yet another object of the invention is to provide a simple, reliable and inexpensive centering mechanism that requires only a small number of standard or easily fabricated parts, that can be efficiently manufactured at low cost, and that provides reliable operation over a long operating life with a minimum of maintenance.

FIG. 1 is a side elevation of a scintillation counter embodying the present invention;

FIG. 2 is a front elevation of the scintillation counter of FIG. 1;

FIG. 3 is an enlarged partial section taken along line 3—3 in FIG. 2;

FIG. 4 is an enlarged partial section of the lower front protion of the detector of FIG. 2, showing the same structure shown in FIG. 3;

FIG. 6 is an enlarged side elevation of the elevator pedestal and associated drive member utilized in the instrument of FIGS. 1–5;

FIG. 7 is a top plan taken along line 7—7 in FIG. 6; and

FIG. 8 is an enlarged section taken along line 8—8 in FIG. 7.

Figure 5:
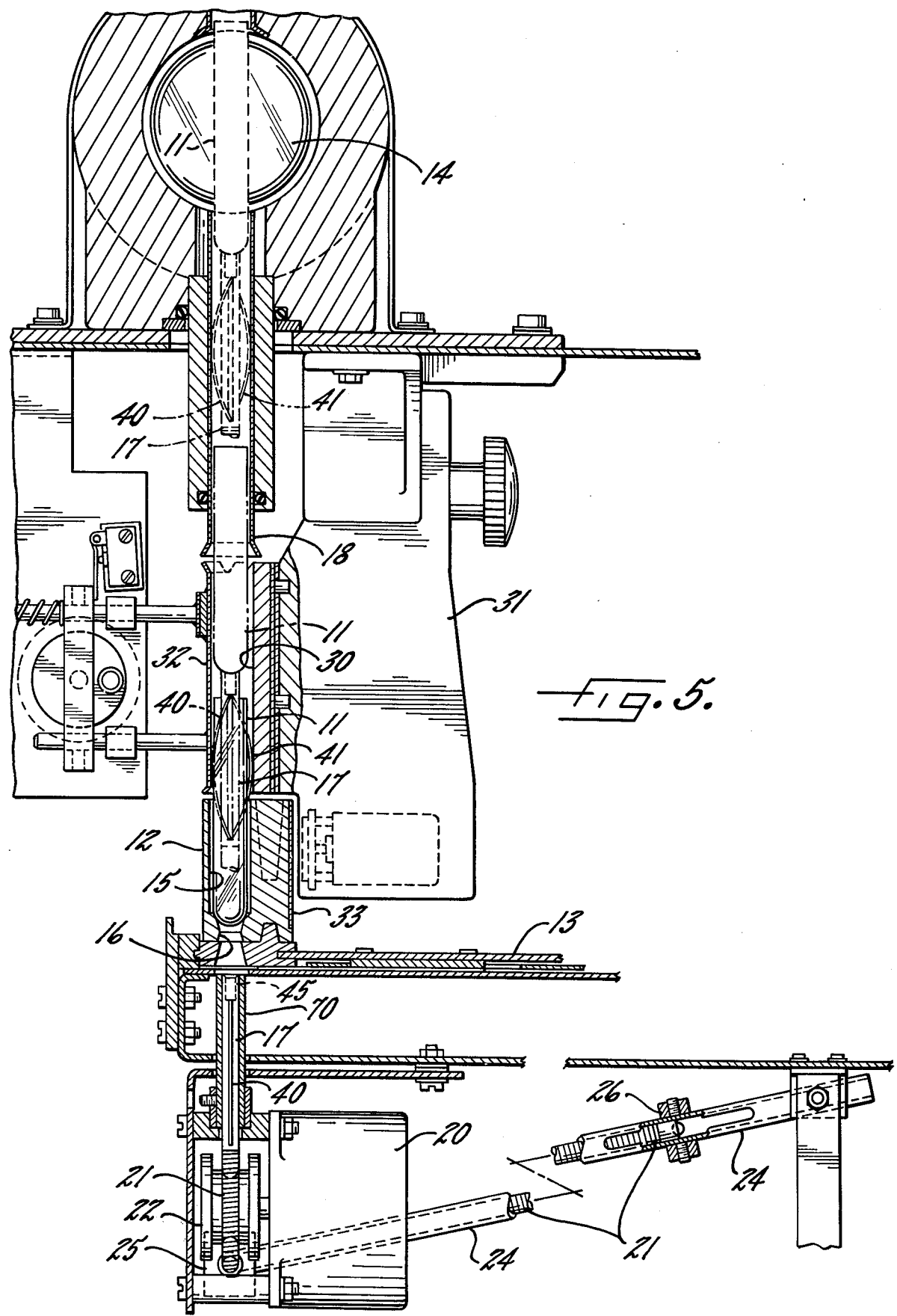
FIG. 5 is an enlarged partial section taken along line 5—5 in FIG. 2.

While the invention will be described in connection with certain preferred embodiments, it is to be understood that the invention is not limited to these particular embodiments. On the contrary, it is intended to cover all alternatives, modifications and equivalent arrangements as may be included within the spirit and scope of the invention as expressed in the appended claims.

Turning now to the drawings and referring first to FIGS. 1 and 2, there is shown a benchtop scintillation counter 10, in which the present invention finds one of its many applications. Rows of tubes 11 containing radioactive samples are shown resting in rows of cassettes 12 on a stage 13 of the counter, ready to be advanced in seriatim into position for transport to a counting chamber 14.

FIG. 4 shows more clearly one of the cassettes 12 holding a plurality of sample tubes 11, with each of the tubes resting loosely in a compartment 15 in the cassette. These tubes 11 may be of different heights and diameters if desired. Apertures 16 in the cassettes 12 below each compartment 15 must be of smaller transverse dimension than the smallest tube in order to support the tubes within the cassette 12, and yet these apertures 16 must be large enough to allow an elevator pedestal 17 (FIG. 5) to pass therethrough. When a cassette 12 is in the position shown in FIG. 4, and more clearly illustrated in FIG. 5, one of the apertures 16 is aligned with an entry tube 18 (FIG. 5) leading to the counting chamber 14, so that advancing the elevator pedestal 17 through the aperture 16 raises one of the tubes 11 into the overhead chamber 14 for counting.

Vertical movement of the elevator pedestal 17 is controlled by a drive motor 20 which raises and lowers an elongated tightly coiled spring 21 attached to the lower end of the pedestal 17. More specifically, the coil spring 21 is driven by frictional engagement with a pulley 22 driven by the motor 20 so that rotation of the pulley 22 in one direction raises the elevator pedestal 17, and rotation of the pulley in the opposite direction lowers the elevator pedestal. The surface of the pulley 22 which engages the spring 21 has a surface of suitable coefficient of friction, and the spring 21 is held firmly against this surface by means of an idler roll 23 mounted beside the pulley 22 so that the combination of the pulley 22 and the idler roll 23 form a nip within which the coiled spring 21 is gripped and held in firm frictional engagement with the surface of the pulley 22.

The trailing end of the coiled spring 21 is telescoped within a stationary hollow tube 24 beneath the stage 13. As can be seen most clearly in FIGS. 3–5, this tube 24 is bent to fit within the available space beneath the stage 13; indeed, the principal advantage of utilizing a flexible drive member such as the coiled spring 21 is the ability of such a flexible member to be accommodated within a limited space so that the height of the instrument need not be increased just to accommodate the elevator drive system. In the particular embodiment illustrated, the reciprocating movement of the trailing end of the coiled spring 21 within the tube 24 is also utilized to sense the "up" and "down" positions of the elevator and to de-energize the drive motor 20 whenever the elevator reaches one of these limit positions. More particularly, a pair of electro-optical sensing elements 25 and 26 are aligned with apertures in the hollow tube 24 so that whenever the trailing end of the coiled spring 21 traverses one of these apertures the drive motor 20 is de-energized. Thus, when the trailing end of the spring 21 traverses the aperture associated with the sensing element 25, it indicates that the elevator has reached its "up" position and an electrical signal is generated to de-energize the motor 20. Similarly, whenever the end of the spring 21 traverses the aperture associated with the sensing element 26, another electrical signal is generated to de-energize the drive motor 20. Energization of the drive motor 20 to initiate the up and down movements of the elevator is initiated by a separate control system, not shown in the drawings, which detects the arrival of each new sample tube at the elevator station to initiate the upward movement of the elevator, and the completion of each sample count within the counting chamber 14 to initiate the downward movement of the elevator.

For the purpose of guiding each sample tube 11 from the cassette 12 to the entry tube 18, a guide plate 30 is secured to the back of a thermal printer 31 in alignment with the front side of the entry tube 18, and cooperating with a retractable guide assembly 32 which in its advanced position is aligned with the back side of the entry tube 18. (The purpose of the thermal printer 31 is to automatically print the sample count onto a record strip 33 carried on the front of each cassette 12, which is not part of the present invention.)

It will be appreciated that it is necessary to retract the guide assembly 32 each time the cassette 12 is indexed to bring a new sample tube into alignment with the elevator station; otherwise this intermediate portion of the guide assembly would interfere with the top portions of the tube 11 projecting upwardly from the cassette 12 as the cassette is successively indexed past the elevator station. While the guide assembly 32 in cooperation with the guide plate 30 provides adequate lateral support for the sample tubes as they are elevated from the cassette 12 to the entry tube 18, it will be appreciated that there is necessarily a gap in the tube passageway at both the top and bottom edges of the guides 30 and 32 because of the necessity of retracting the rear guide assembly 32 and the necessity for indexing the cassette 12 beneath both the guide members 30 and 32.

In accordance with one important aspect of the present invention, the elevator pedestal is centered within the passageway that it traverses by a centering mechanism comprising a plurality of smooth resilient guide elements secured to the pedestal, the guide elements being oriented generally along the axis of travel of the pedestal and bowed outwardly from the pedestal for continuously engaging the walls of the passageway and urging the pedestal toward the center of the passageway regardless of the transverse dimension thereof. Thus, in the illustrative embodiment three flexible resilient guide wires 40, 41 and 42 are disposed within the pedestal 17 with the ends of the three wires secured to a pair of caps 43 and 44. These end caps 43 and 44 are suitably in the form of short lengths of hollow tubing into which the ends of the guide wires 40-42 are inserted and then soldered in place so that the adjacent ends of all three wires are fixed relative to each other. This assembly of the three wires 40-42 and the two end caps 43 and 44 then forms a cartridge which can be inserted into the hollow interior of the pedestal 17 and held therein by a pair of set screws 45 and 46 threaded into opposite ends of the pedestal.

To permit the guide wires 40-42 to bow outwardly from the pedestal 17 for engagement with the walls of the passageway through which the elevator pedestal 17 is driven, the pedestal 17 is provided with three longitudinal slots 47, 48 and 49 which communicate with the hollow interior of the pedestal 17. Consequently, when the guide wires 40-42 are aligned with the slots 47-49 and compressed, the wires bow outwardly through the respective slots to provide continuous three-point engagement with the walls of the elevator passageway. The degree of bow in the wires 40-42 may be easily adjusted by turning one or both of the set screws 45 and 46, to accommodate different sized passageways, for example. The width of the slots should be just slightly greater than the thickness of the guide wires 40-42 so that the wires pass freely therethrough, while still providing lateral support for the wires to prevent any significant lateral displacement of the wires.

In order to maintain the guide wires 40-42 bowed outwardly from the elevator pedestal while still permitting the wires to retract within the pedestal 17, at least one end of each wire is attached to a biasing means within the pedestal 17. In the embodiment illustrated in FIG. 8, this biasing means comprises a compressed coil spring 50 urging one end of each guide wire 40-42 toward the other end thereof so that the central portion of each guide wire is bowed outwardly approximately the same distance from the pedestal 17. More than one spring may be used, such as one at each end of the guide wires 40-42, but it has been found that one such spring is sufficient. The precise dimensions and strength of the spring 50 are not critical as long as it applies sufficient axial force to bow all of the guide wires 40-42 outwardly far enough to maintain contact with the widest segment of the passageway traversed by the elevator pedestal 17, and yet is sufficiently flexible to allow all of the guide wires to be compressed fully within the pedestal without permanent deformation of either the guide wires or the spring 50. The biasing spring 50 may be located at either the upper or the lower end of the elevator pedestal 17, although placing the spring at the lower end is preferred since it permits the length of the pedestal to be minimized by utilizing the space within the elongated lower end of the pedestal that is required to attach the pedestal to the coil spring 21.

The elevator pedestal 17 is shown of roughly cylindrical shape, but it may be made in other configurations. It is only necessary that the width of the pedestal be small enough to pass through the smallest portion of the passageway in which it is used, that one end of the pedestal be adapted for raising and lowering the sample tubes 11, and that the other end be adapted for attachment to the elongated flexible spring 21. It is preferred that the top end of the pedestal 17 be shaped with a shallow depression 51 capable of supporting samples tubes 11 of different sizes, such as the tube 11 illustrated in FIG. 8. It is also preferred that the bottom end of the pedestal 17 be shaped to allow insertion of the lower end of the pedestal into one end of the hollow elongated spring 21 so as to form a tight friction fit, as shown in FIG. 6. This fit should be tight enough to keep the pedestal attached to the spring 21 at all times as the spring pulls and pushes the pedestal through narrow passageway segments and past boundaries between segments of different widths, yet not so tight as to make removal of the pedestal by hand overly difficult.

In order to properly center the elevator pedestal, the guide wires 40-52 are preferably spaced symmetrically around the periphery of the pedestal 17 so that the wires continuously urge the pedestal toward the center of the passageway that it traverses. In the particular embodiment illustrated, three guide wires are arranged symmetrically around the pedestal, but it will be understood that any greater number of guide wires could be used if desired. It would also be possible to use only two guide wires located on approximately opposite sides of the pedestal and sliding in grooves or channels formed in the inside walls of the passageway. It is preferred that all the guide wires 40-42 be approximately equal in length, width, resiliency, and smoothness, so that they are bowed approximately the same distance outwardly from the pedestal and do not skew the pedestal to one side because of unequal frictional drag. Such wires also have uniform curvature in the bowed position. The guide wires may be made of any smooth and resilient material that is also stiff enough to resist permanent deformation when subjected to repeated flexing.

In order to achieve proper centering and stability, and to prevent the pedestal from jamming, the guide wires 40-42 are preferably oriented generally along the axis of travel of the elevator (which in the particular embodiment is vertical). This enables the leading portions of the wires to act as a type of "wedge" so that the pedestal will remain approximately centered as it enters and leaves passageway segments of different widths. It also enables the pedestal to ride over small proturberances or "necks," and travel past gaps, without jamming. The precise orientation of the guide elements is not critical, and they may, in fact, be skewed with respect to the direction of travel, as long as there is sufficient orientation along the axis of travel to prevent the guide wires from jamming in gaps or at boundaries between passageway segments of different widths. The length of the bowed wires should be sufficient to bridge any gaps in the passageway and to engage the inside walls of the widest passageway segment through which the pedestal travels.

The function of the present invention as the pedestal 17 travels through its passageway is most clearly illustrated in FIG. 5. It can be seen that the passageway formed by the cassette 12 and the various guide elements, is of varying width and contains at least two gaps (at the top and bottom edges of guide elements 30 and 32). The major portion of this passageway has a diameter significantly greater than that of the pedestal 17. When the elevator pedestal 17 is in the "down" position within guide tube 70 all the guide wires 40-42 are compressed fully within the slots 47-49. As the pedestal travels up through the cassette 12, it must negotiate a highly irregular portion of the passageway. In particular, the width of this portion varies continuously over a short distance, and abruptly in at least one place. However, the smooth leading portions of the guide wires 40-42 along with the outward bowing, enable the pedestal to ride smoothly past these irregularities to remain approximately centered in the passageway at all times. Centering is particularly important at this point in order for the tube 11 to be properly seated on the top of the pedestal.

As the pedestal continues to rise through the cassette, the width of the elevator passageway suddenly becomes significantly greater (since this compartment must be wide enough to accommodate the largest sample tube being used). At this point, the guide wires 40-42 bow outwardly from the pedestal and continue to engage the inside walls of the cassette, thus maintaining the pedestal in centered position.

The pedestal must next traverse the guide members 30 and 32 and the gaps at the top and bottom thereof. The gaps present no problem, since the guide wires 40-42 are long enough to bridge the gaps, and since the bowing of the guide elements avoid jamming of the sample tube 11 or the pedestal 17 in the gaps. Furthermore, the fact that the guide wires are oriented generally along the axis of travel, the fact that the wires are smooth, and the fact that the wires are of uniform curvature, all provide a type of wedging action to facilitate entry into and exit from the passageway segments on either side of the gaps, to prevent jamming, and to prevent the sample tube from falling off the pedestal.

As the pedestal 17 travels between the guide members 30 and 32, the guide wires remain bowed outwardly since this portion of the passageway must be wide enough to allow passage of the widest sample tube being used. It is also important that the pedestal be centered within this portion of the passageway because if a very small sample tube were being transported, and if the pedestal were not centered, the tube might slip off the pedestal and into the passageway alongside the pedestal, thus jamming the entire system.

When the pedestal reaches its maximum height within the entry tube 18, it is temporarily brought to rest to maintain the sample tube 11 within the counting chamber 14 for the required counting time. The guide wires remain bowed during this dwell period, and then when counting is complete, the sample tube is lowered back into its compartment in the cassette. Again, centering is important during the return movement of the elevator so that the tube re-enters the cassette compartment without damaging the tube or spilling the contents.

I claim as my invention:

1. In a benchtop scintillation counter having a vertical well through which sample vials are transported between a cassette holding a row of sample vials and an overhead counting chamber by an elevator pedestal, said cassette having a hole beneath each vial that is small enough to prevent the vial from passing therethrough but large enough to allow passage of said elevator pedestal therethrough, a transverse dimension of said well varying along the length thereof with at least a portion of said well having a transverse dimension significantly greater than that of said pedestal, means for advancing and retracting said pedestal through said cassette and vertical well, a mechanism for centering said pedestal within said well comprising the combination of a plurality of smooth resilient guide elements secured within said pedestal, said guide elements being oriented generally along the axis of travel of said pedestal and bowed outwardly from said pedestal by at least one biasing means within said pedestal for continuously engaging the walls of said well and urging said pedestal toward the center of said well regardless of the transverse dimension of said well, said pedestal forming a plurality of slots with one of said guide elements projecting through each of said slots, said slots being oriented generally along the axis of travel of said pedestal in accordance with the orientation of said guide elements and spaced around the periphery of said pedestal in accordance with the spacing of said guide elements, the width of said slots being slightly greater than the width of said guide elements, and the length of said slots being slightly greater than the length of said guide elements, for allowing said guide elements to be compressed fully within said slots and for providing lateral support for said guide elements as they flex in and out of said slots, the transverse dimension of at least a portion of said well varying abruptly along the length thereof with the bowing of said guide elements being sufficient to allow easy passage of said pedestal past said abruptly-varying portion, at least part of said well being formed by at least two hollow segments separated by a gap with the length and bowing of said guide elements being sufficient to allow easy passage of said pedestal past said gap and to keep said pedestal approximately centered as it enters and leaves each of said hollow segments.

2. In a benchtop scintillation counter, the combination as set forth in claim 1 wherein said biasing means urging at least one end of each of said guide elements toward the other end thereof so that the central portion of each guide element is bowed outwardly approximately the same distance from said pedestal.

3. In a benchtop scintillation counter, the combination as set forth in claim 2 wherein the strength of said biasing means is sufficient to bow said guide elements enough to keep them in contact with the walls of said well at all times and to keep said pedestal approximately centered at all times, said biasing means also being sufficiently flexible to allow said guide elements to be compressed fully within said pedestal when said pedestal traverses portions of said well having a transverse dimension approaching that of said pedestal.

4. In a benchtop scintillation counter, the combination as set forth in claim 3 wherein said biasing means comprises at least one compressed coil spring within said pedestal.

5. In a benchtop scintillation counter, the combination as set forth in claim 1 wherein said guide elements are spaced symmetrically around the periphery of said pedestal.

6. In a benchtop scintillation counter, the combination as set forth in claim 1 wherein the top of said elevator pedestal is recessed to hold the bottom of a sample vial thereon in the center of the counting chamber.

* * * * *